(No Model.)

C. A. TAYLOR.
BUTTONER.

No. 349,415. Patented Sept. 21, 1886.

Witnesses.
S. N. Piper
H. B. Torrey

Inventor.
Charles A. Taylor.
by R. H. Eddy atty.

UNITED STATES PATENT OFFICE.

CHARLES AVERY TAYLOR, OF BROCKTON, MASSACHUSETTS.

BUTTONER.

SPECIFICATION forming part of Letters Patent No. 349,415, dated September 21, 1886.

Application filed May 3, 1886. Serial No. 200,957. (No model.)

*To all whom it may concern:*

Be it known that I, CHARLES AVERY TAYLOR, of Brockton, in the county of Plymouth, of the Commonwealth of Massachusetts, have invented a new and useful Improvement in Boot-Buttoners; and I do hereby declare the same to be described in the following specification and represented in the accompanying drawings, of which—

Figure 1:
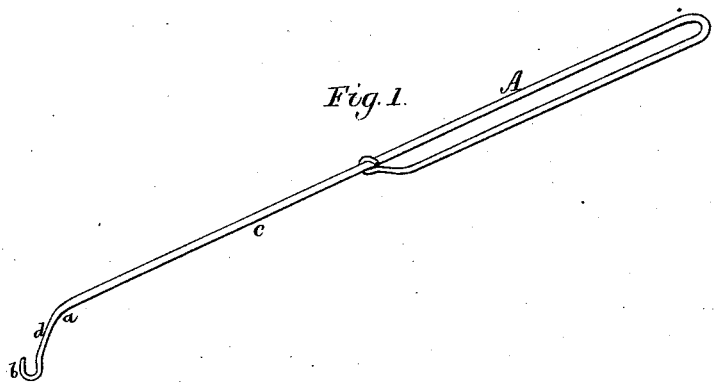
Figure 2:
Figure 3:
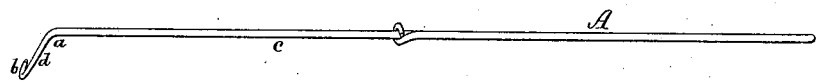

Figure 1 is a perspective view, Fig. 2 a plan, and Fig. 3 an elevation, of a boot-buttoner of my invention, the nature of which is defined in the claim hereinafter presented.

As shown in such drawings, the article is made of a single piece of wire doubled or bent to form an open handle, A, with the piece at the inner end of the handle bent or coiled around the next adjacent part of the wire, in order to connect the two. Near its other end the wire is tapered and bent at an obtuse angle, as seen at $a$, and at the end is hooked or bent, as shown at $b$. From the above it will be seen that beyond the handle the wire constitutes a shank, $c$, terminating in a hook whose shank $d$ is at an obtuse angle to the shank $c$. The whole makes a boot-buttoner that to fleshy persons and others will be found particularly convenient for effecting the buttoning of their boots. To use it, the oblique hook is to be introduced through the button-hole and hooked about the button-eye. Next the button is to be drawn and pried through the button-hole, which can be effected with much ease after a little practice, very little stooping or bending of the body being required to manipulate the said buttoner.

I do not claim button-hooks made as represented in the United States Patents Nos. 208,858, 218,570, and 277,181, as neither has, like mine, a single hook having its shank arranged at an obtuse angle, with a long shank extending from a handle, one of them having two and the other three hooks in one piece of wire, and the other having a loop for use in buttoning. Nor does either show an open handle or loop, a shank extending therefrom, and a single hook having its shank in continuation of and at an obtuse angle to the longer shank, as is the case with my improved buttoner.

I claim—

As an improved article of manufacture, the described boot-buttoner, formed from a continuous piece of wire, bent and hooked upon itself to form an open oblong handle, and having the shank or part extending from said handle bent transversly, and provided with a button-hook near the bend, as described.

CHARLES AVERY TAYLOR.

Witnesses:
 R. H. EDDY,
 R. B. TORREY.